United States Patent
Guirnalda et al.

(10) Patent No.: US 11,446,573 B2
(45) Date of Patent: Sep. 20, 2022

(54) METHODS AND SYSTEMS FOR PROVIDING AN ASYNCHRONOUS MASSIVE MULTIPLAYER APPLICATION

(71) Applicant: Verizon Patent and Licensing Inc., Basking Ridge, NJ (US)

(72) Inventors: Christian Guirnalda, Cranbury, NJ (US); Joshua Christopher Ness, Brooklyn, NY (US); Julian Gompertz, Stamford, CT (US); Cory Terzis, Wyckoff, NJ (US); Andrew Linde, New Milford, CT (US); Jayaporsith Suong, Brooklyn, NY (US); John O'Meara, Breezy Point, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 17/019,979

(22) Filed: Sep. 14, 2020

(65) Prior Publication Data

US 2022/0080305 A1    Mar. 17, 2022

(51) Int. Cl.
| | |
|---|---|
| *A63F 13/355* | (2014.01) |
| *H04L 65/60* | (2022.01) |
| *H04L 67/1095* | (2022.01) |
| *H04L 67/01* | (2022.01) |
| *H04L 67/52* | (2022.01) |
| *A63F 13/216* | (2014.01) |
| *A63F 13/573* | (2014.01) |
| *H04L 67/131* | (2022.01) |
| *G06F 3/0482* | (2013.01) |

(52) U.S. Cl.
CPC .......... *A63F 13/355* (2014.09); *A63F 13/216* (2014.09); *A63F 13/573* (2014.09); *H04L 65/60* (2013.01); *H04L 67/1095* (2013.01); *H04L 67/18* (2013.01); *H04L 67/38* (2013.01); *H04L 67/42* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 8,469,824 B1 * | 6/2013 | Farley | .......................... | F41J 5/02 |
| | | | | 434/21 |
| 2010/0026809 A1 * | 2/2010 | Curry | ................. | H04N 5/23238 |
| | | | | 348/157 |

(Continued)

*Primary Examiner* — Reginald A Renwick

(57) ABSTRACT

An illustrative multi-access server system obtains trajectory data from a plurality of client devices engaged in a massive multiplayer application. The trajectory data is representative of asynchronous attempts, by users of the plurality of client devices, to direct respective virtual objects associated with each client device to a target at a real-world location and associated with a real-world event. Based on the trajectory data, the system determines a plurality of virtual trajectories for the asynchronous attempts to direct the respective virtual objects to the target, and, based on the plurality of virtual trajectories, renders a plurality of videos that each concurrently depict the asynchronous attempts to direct the respective virtual objects to the target. The system also streams different videos to different client devices, including customized videos for each client device. Corresponding methods and systems are also disclosed.

20 Claims, 8 Drawing Sheets

(56) References Cited

U.S. PATENT DOCUMENTS

| | | | |
|---|---|---|---|
| 2012/0015730 A1* | 1/2012 | Watkins, Jr. | A63F 13/216 |
| | | | 463/36 |
| 2015/0100179 A1* | 4/2015 | Alaniz | B60W 50/14 |
| | | | 701/1 |
| 2016/0322078 A1* | 11/2016 | Bose | A63B 24/0003 |
| 2019/0155384 A1* | 5/2019 | Fajt | A63F 13/25 |
| 2019/0392643 A1* | 12/2019 | Busto | G06F 3/011 |

* cited by examiner

METHODS AND SYSTEMS FOR PROVIDING AN ASYNCHRONOUS MASSIVE MULTIPLAYER APPLICATION

BACKGROUND INFORMATION

Communication and networking technologies continue to evolve, advance, and provide connectivity for all types of devices and applications. As these technologies develop and expand, traditional computing models are being enhanced or replaced in some instances by distributed computing models in which processing required by individual computing devices (e.g., mobile devices such as smartphones and tablets, Internet of Things (IoT) devices, consumer and business personal computers, etc.) is not performed exclusively by local computing resources of the devices themselves, but, rather, is at least partially performed by computing resources located elsewhere. Such distributed computing models may increase the efficiency of processing that is performed because, among other reasons, powerful computing resources shared by many devices can be concentrated and managed at a single site rather than being replicated in each device. As computing and communication technologies continue to advance in these ways, distributed computing models may be used to solve new problems and provide new experiences for users that have not been feasible in the past.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
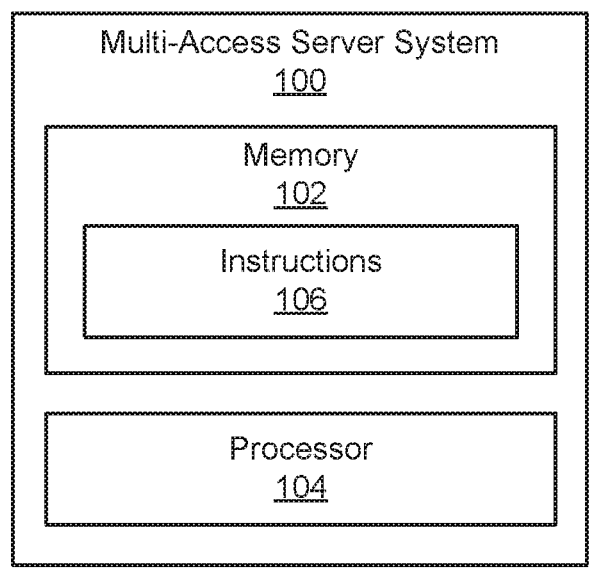
FIG. 1 shows an illustrative multi-access server system for providing an asynchronous massive multiplayer application according to embodiments described herein.

Methods and systems for providing an asynchronous massive multiplayer application are described herein. Conventional massive multiplayer applications may employ a game engine that tracks state data for a shared universe being experienced by, typically, dozens or hundreds of users each engaging synchronously with the application. For example, hundreds of players may concurrently engage together in a first-person shooter massive multiplayer application in which each player inhabits the same virtual universe with the other players and is able to engage with other players (e.g., by seeing, talking to, attacking, defending, or otherwise interacting with the other players) in accordance with rules, aims, and limitations of the particular application. Because of the interactive nature of this gameplay (e.g., players' actions affect other players in real time as players attack or fend off attacks from one another, etc.), such applications may be referred to as synchronous massive multiplayer applications.

As will be described in more detail below, asynchronous massive multiplayer applications provided by methods and systems described herein may also include certain interactive elements, but are referred to as asynchronous at least due to the potential standalone nature of the application execution (e.g., gameplay). That is, the aims of these applications may be such that the applications may support actions performed either concurrently or non-concurrently by users that may be co-located at a single site or distributed at various different geographical sites as may serve a particular implementation.

As one example of an asynchronous massive multiplayer application provided by methods and systems described herein, a massive multiplayer game referred to herein as an "Ultra Toss" game will be considered in which tens of thousands of players may asynchronously (e.g., concurrently or non-concurrently) engage while located at a venue of a large-scale sporting event (e.g., an American football stadium, etc.). In this example, each player within the venue may be presented (e.g., using augmented reality on his or her mobile device in certain examples) with a target that is located in the center of a field on which the sporting event is taking place (e.g., a virtual pickup truck made to appear, by way of augmented reality, on the 50-yard line of a football field). The player may manipulate certain controls on a device (e.g., a mobile device) to try to direct a virtual object (e.g., a virtual football, etc.) toward the target with the goal of hitting the target or otherwise successfully directing the virtual object to the target (e.g., landing the virtual football in the bed of the pickup truck).

Concurrently or at different times (e.g., during a half-time event that is announced where all players are invited to throw their respective footballs within a time period of a minute or two, anytime during a first half of the football game, etc.), thousands of other players may also attempt to likewise direct their own virtual objects to the same target (e.g., land their own virtual footballs in the bed of the virtual pickup truck). Additional players not present at the stadium (e.g., watching the game from home) may also be able to participate on their mobile devices in certain ways described in more detail below.

Regardless of when the asynchronous attempts to direct virtual objects to the target occur, each player of this illustrative asynchronous massive multiplayer game may receive information representative of not only how the player himself or herself performed, but also information representative of some of the other players (e.g., friends or contacts of the player, people in the same demographic category as the player, etc.) or of all the other players. For example, a different video may be provided to each player that emphasizes the player's own attempt (e.g., following the player's football from the player's location in the stands to whatever location the player directed his or her virtual object to with his or her attempt) while concurrently showing the concurrent or previous attempts that have been made by other players (e.g., a video showing thousands of footballs being thrown onto the field from all directions in the stadium at the same time). Additionally, each player may receive information (e.g., textual information, a video presentation, etc.) indicative of whether he or she successfully directed the virtual object to the target (e.g., "hit" the target by landing the football in the bed of the pickup truck), about other players who hit the target, about a player deemed to be the "winner" of the game, and so forth.

In certain examples, asynchronous massive multiplayer applications such as the "Ultra Toss" example described above may be provided to tens of thousands of users in real-time and/or with very low latency in a manner that would not be feasible without powerful computing resources accessible using distributed computing models and modern communication technology (e.g., 5G provider network technologies, multi-access edge computing (MEC) server technologies, etc.). For instance, MEC and/or other corresponding technologies (e.g., 5G network technologies) may be used to allow for real-time simultaneous gameplay for tens of thousands of users (e.g., users within a large sporting arena or music venue, etc.), to facilitate caching and streaming augmented reality content from multi-access servers such as MEC servers or cloud servers, to generate customized and high-fidelity video content for each user, and so forth.

Conventional massive multiplayer application models typically involve a multi-access server that tracks and provides state data to a set of client devices (e.g., dozens or hundreds of devices) to allow individual client devices to render their own custom view of the world. While such models could be applied to provide certain aspects of the asynchronous massive multiplayer applications described herein, it would not be feasible to provide other aspects of these applications without novel distributed computing models described herein. For instance, referring again to the illustrative "Ultra Toss" game described above as an example, conventional computing models may allow each player's mobile device to render a video of the player's own object trajectory, as well as, perhaps, a trajectory of the winner of the game. It would be infeasible, however, for the mobile device to render a high-fidelity image depicting the potentially tens of thousands of other trajectories all concurrently with one another. Current mobile device technology simply lacks sufficient computing power to render such video without significant delay or an extremely compromised quality level.

In contrast, using methods and systems described herein, powerful computing resources concentrated at multi-access servers such as cloud servers and MEC servers may be employed to render extremely complex videos (e.g., videos depicting accurately-modeled paths of thousands of footballs in the above example) with extremely low latency (e.g., such that the renderings are loaded and presented to users immediately and in real time). In this way, a unique and positive experience may be provided to large numbers of users such as thousands of fans at a sporting event, thousands of concertgoers at a music event, or any other suitable number of users that may take part in a massive multiplayer application associated with any suitable real-world event (or that may not be associated with any particular real-world event in certain examples).

While various benefits arise from implementing asynchronous massive multiplayer application on a multi-access server system in the ways described herein (e.g., including implementing video rendering on the multi-access server system instead of on the client devices, etc.), it will be understood that particular benefits may result from deploying such an application on a high-speed, low-latency MEC server deployed within a provider network (e.g., a cellular network managed by a mobile network operator, etc.) rather than deploying the application, for example, within a commercial cloud instance or other type of multi-access server. For example, MEC servers that deploy asynchronous massive multiplayer applications described herein may provide rendered video and target verification data with latency that is low enough to seem instantaneous to users, thereby allowing multiple user actions and results realized in real time. Accordingly, by not requiring communications to travel outside of a provider network (e.g., to propagate to a cloud-based system outside of the provider network such as on a third party system accessible via the Internet), MEC servers may be especially well-adapted to create responsive (e.g., low-latency, etc.) and enjoyable implementations of asynchronous massive multiplayer applications described herein.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein for providing an asynchronous massive multiplayer application may provide any of the benefits mentioned above, as well as various additional and/or alternative benefits that will be described and/or made apparent below.

FIG. 1 shows an illustrative multi-access server system 100 (system 100) for providing an asynchronous massive multiplayer application according to principles described herein. System 100 may be implemented by computer resources such as servers, processors, memory devices, storage devices, communication interfaces, and so forth. For example, system 100 may include, be implemented by, or be otherwise associated with one or more multi-access servers (e.g., MEC servers, cloud servers, etc.) or other suitable computing systems (e.g., local servers, etc.). As such, a computing system implementing system 100 may be configured to host or otherwise facilitate an asynchronous massive multiplayer application that is executed by a potentially large number of client devices (e.g., mobile devices such as smartphones, tablet devices, smart watches, etc.) and that allows a large number of users of the client devices (e.g., tens of thousands of users in certain examples) to asynchronously engage in the application.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with providing an asynchronous massive multiplayer application as described herein and/or in any alternative way as may serve a particular implementation.

Figure 2:
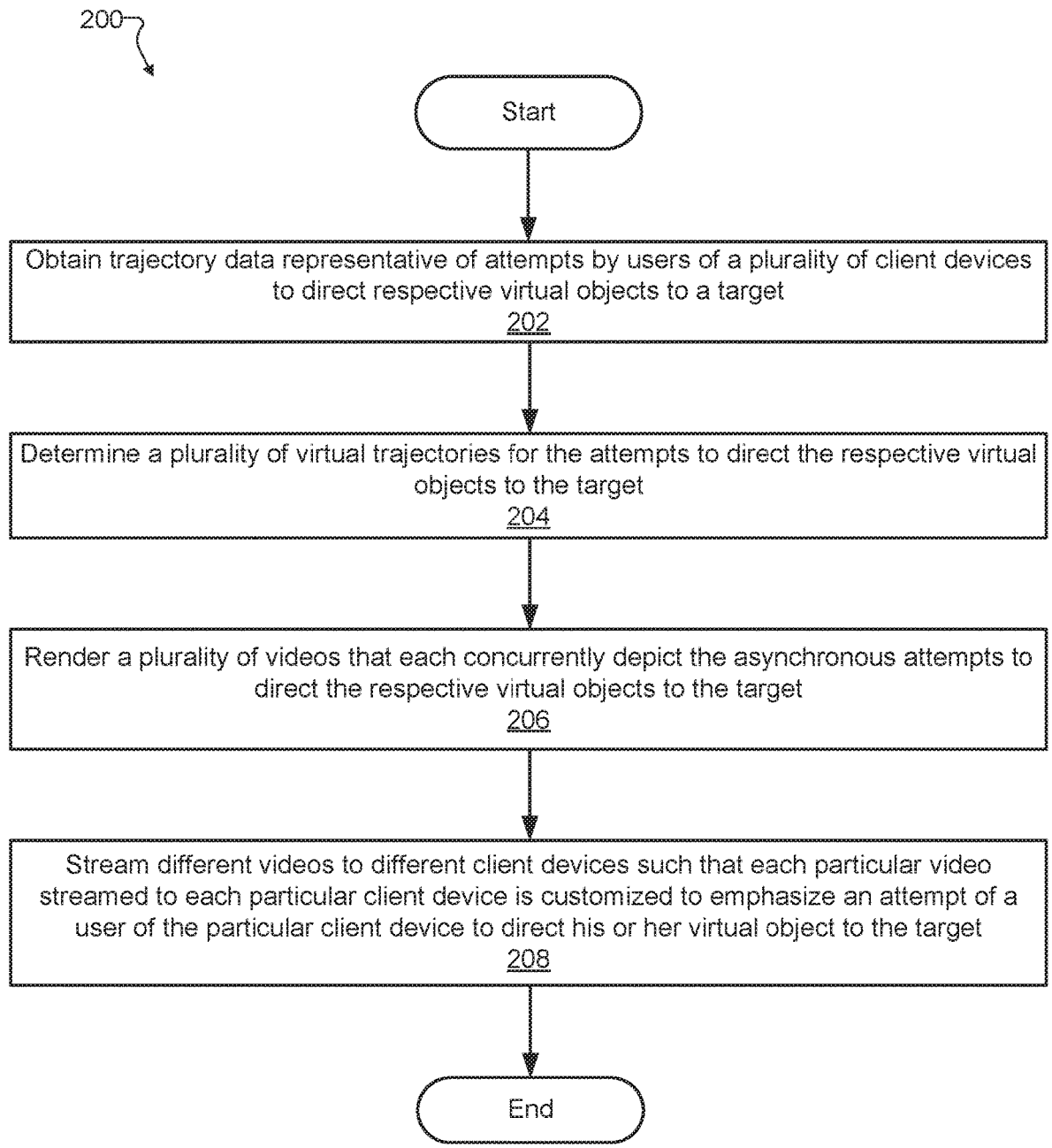
FIG. 2 shows an illustrative method for providing an asynchronous massive multiplayer application according to embodiments described herein.

As one example of functionality that processor 104 may perform, FIG. 2 shows an illustrative method 200 for providing an asynchronous massive multiplayer application according to principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a multi-access server system such as system 100 and/or any implementation thereof.

In some examples, the operations of FIG. 2 may be performed in real-time so as to provide, receive, process, and/or use data described herein immediately as the data is generated, input, updated, changed, exchanged, or otherwise becomes available. As a result, system 100 may be configured to provide asynchronous massive multiplayer applications described herein in a responsive, on-demand way (e.g., so that there is little or no noticeable delay experienced by users). Real-time operations will be understood to refer to operations performed immediately and without undue delay, even if it is not possible for there to be absolutely zero delay. As mentioned above, this real-time performance may be accomplished by performing some or all of the operations described above on multi-access servers rich with computing resources (e.g., MEC or other servers configured to perform computing tasks using an arbitrary amount of parallel computing power so as to perform computing tasks with a very low latency). For instance, systems described herein may provide live and up-to-date application information (e.g., video depicting an individual user's own trajectory when launching a virtual object at a target, video depicting other users' trajectories, etc.) immediately after an action is performed (e.g., immediately after an attempt is made to direct a virtual object to a target and even as the virtual object may still be moving toward the target, etc.). Each of operations 202-208 will now be described.

At operation 202, system 100 may obtain trajectory data from a plurality of client devices engaged in a massive multiplayer application. For example, the trajectory data may be representative of asynchronous attempts, by users of the plurality of client devices, to direct respective virtual objects associated with each client device to a target at a real-world location and associated with a real-world event. As has been described, the plurality of client devices may include up to tens of thousands client devices (or even more in certain embodiments) that all asynchronously provide opportunities for respective users to perform the task of directing a respective virtual object to the target (or another suitable task that the users may each asynchronously attempt). The target may be a virtual target (e.g., a virtual object depicted at a real-world location using mixed reality or augmented reality technology) or a real target (e.g., a real object that exists in the real world). For instance, referring to the "Ultra Toss" application described above, a virtual pickup truck that drives out and parks in the middle of a football field during a half-time event may be one example of a virtual target, while the actual goalposts on either end of the football field or a physical marking painted on the field (e.g., a team logo at the 50-yard line, etc.) may be examples of real-world targets.

Whether a given target is virtual or real, the target to which the virtual objects are to be directed may be located at a real-world location associated with a real-world event. For example, a virtual object such as a virtual pickup truck may be positioned at a real-world location by being depicted (e.g., using augmented reality on the users' devices) at a particular place on the field (e.g., at the center of the field on the 50 yard line). Conversely, a real-world object such as a real goalpost may be positioned at a real-world location by virtue of the object's actual location in the world (e.g., at the end of the football field in the case of a goalpost object). The real-world locations described above (e.g., the 50-yard line, the end of the field, etc.) are associated with the real-world event of a real-world football game or, in some examples, a real-world halftime entertainment show, or the like.

While the football game example in which users try to direct virtual footballs to a target on the field is used throughout this description, it will be understood that various implementations may involve other types of objects or applications associated with other real-world locations and/or other types of real-world events. For example, attendees to a professional basketball game may be provided an opportunity to play a similar "Ultra Toss"-type game by trying to direct a virtual basketball into one of the real basketball hoops on the court, attendees to a professional baseball game may be provided an opportunity to try to direct a virtual baseball to hit a real or virtual mascot of the opposing team, and so forth for other types of sporting events. Additionally or alternatively, certain asynchronous massive multiplayer application implementations may be associated with a non-sporting event such as a concert, a play, a comedy performance, a recording of a television show, or the like, and users may be invited to direct suitable virtual objects toward suitable targets as may fit with a theme of the event (e.g., throwing virtual pies or rotten tomatoes at a villain in a play, throwing virtual money toward one or several different donation bins at a charity concert, directing virtual votes toward one candidate on stage during the recording of a reality television show, etc.).

The trajectory data obtained at operation 202 may be generated, provided, and received (or otherwise accessed or obtained) in any suitable manner as may serve a particular implementation. For instance, each user may be instructed to direct (e.g., throw, launch, etc.) their respective virtual object by designating parameters such as a horizontal aim parameter (e.g., a direction at which the virtual object will be launched with respect to left and right directionality), a vertical aim parameter (e.g., a direction at which the virtual object will be launched with respect to up and down directionality), a velocity or power parameter (e.g., an amount of force to be applied to the virtual object when launched in accordance with the horizontal and vertical aim parameters), a spin parameter, and/or any other parameters (or fewer parameters) as may serve a particular implementation. In some examples, the trajectory data obtained at operation 202 may include data representative of the raw input parameters provided by each user. Additionally or alternatively, the trajectory data may include equations (e.g., parabolic equations, etc.) derived from the raw input parameters and configured to describe the motion of the virtual objects in three-dimensional space, or other suitable trajectory data indicative of how each particular virtual object has been directed by each respective user engaged in the application.

At operation 204, system 100 may determine a plurality of virtual trajectories for the asynchronous attempts by the users to direct the respective virtual objects to the target. These determinations may be made using a physics engine to simulate real-world effects such as gravity, air resistance, collision or ricocheting effects (e.g., bounce height, deflection from real or virtual objects in the environment, etc.), and so forth for each virtual trajectory. In some examples, the virtual trajectories may be implemented as equations (e.g., parabolic equations, etc.) or other suitable representations of how each virtual object is to move through space. The virtual trajectories may be determined at operation 204 based on the trajectory data obtained at operation 202. For instance, in examples where the trajectory data includes raw input parameters (e.g., the horizontal and/or vertical aim parameters, the velocity and/or spin parameters, etc.), system 100 may use these parameters at operation 204 to simulate and derive the virtual trajectories. In other implementations (e.g., implementations in which each client device uses the input parameters received by the user to calculate a virtual trajectory and then provides the equations defining the virtual trajectory to system 100), the trajectory data may already directly represent the virtual trajectories such that operation 204 may be performed by receiving the trajectory data and identifying the predetermined virtual trajectories represented by the data.

In certain examples, trajectories of virtual objects determined at operation 204 may be determined independently so as to not account for other trajectories of other virtual objects. In other examples, trajectories for virtual objects launched concurrently may be determined in a manner that accounts for interactions of the virtual objects with one another (e.g., virtual footballs bouncing off one another in mid-air, etc.). In these examples, system 100 may perform advanced physics simulation to track and determine complex trajectories for potentially thousands of objects launched concurrently (e.g., so that the time when each objects is in the air at least partially overlaps with time that other objects are in the air and each object is likely to bounce of multiple other objects, etc.).

At operation 206, system 100 may render a plurality of videos. For example, each of these rendered videos may concurrently depict the asynchronous attempts to direct the respective virtual objects to the target and may be rendered based on the plurality of virtual trajectories determined at system 100. For examples in which a large number (e.g., tens of thousands, etc.) of users are engaged in the asynchronous massive multiplayer application, this rendering at operation 206 may involve substantial processing that is only achievable on any suitable timescale when performed by very powerful and/or parallelized computing resources such as those available at a multi-access server (e.g., a MEC server, a cloud server, etc.) accessible to the client devices.

It is noted that this approach is distinct from a typical approach taken by conventional massive multiplayer gaming applications, where each client device renders its own custom video based on state data received from a centralized server. In this example, rather than providing such data and leaving each client device to render its own video, system 100 itself renders one or more custom videos for every client device such that the client device need only receive and present the video and not render the graphics based on state data. This approach is advantageous for this type of application for various reasons including that it may not be feasible for client devices (e.g., mobile devices such as phones carried by users to the real-world event) to render a video depicting all the asynchronous attempts on any timescale close to a real-time timescale. For example, while a mobile device such as a smartphone may be configured to render a video in real time that shows the user's own virtual trajectory (e.g., the user's own football traveling toward the target, etc.), the mobile device may not include the resources needed to render thousands of concurrent trajectories (e.g. of all the other users' footballs traveling toward the target from all over the stadium) in real-time and/or with a reasonably high level of quality. This is particularly true when complex physics simulations are accounted for in the determined trajectories and the virtual objects are able to interact with one another (e.g., bouncing off one another, etc.) and/or with real objects in the environment. Accordingly, system 100 may be configured to perform operation 206 in a manner that alleviates the significant processing burden from the client devices and places that burden with the powerful and highly-parallelizable computing resources of a multi-access server such as described herein.

At operation 208, system 100 may stream different videos of the plurality of videos rendered at operation 206 to different client devices of the plurality of client devices. For example, particular videos streamed to each particular client device may be customized to emphasize (e.g., over other asynchronous attempts by other users of other client devices) an attempt of a user of the particular client device to direct a virtual object associated with the particular client device to the target. To illustrate using the "Ultra Toss" example that has been described, system 100 may stream videos to each client device including a video that shows just the attempt (e.g., throw, etc.) of that client device, a video that shows all of the attempts of all of the client devices (but where the vantage point follows the attempt of the client device to emphasize it over the others), and other suitable videos described in more detail below.

Figure 3:
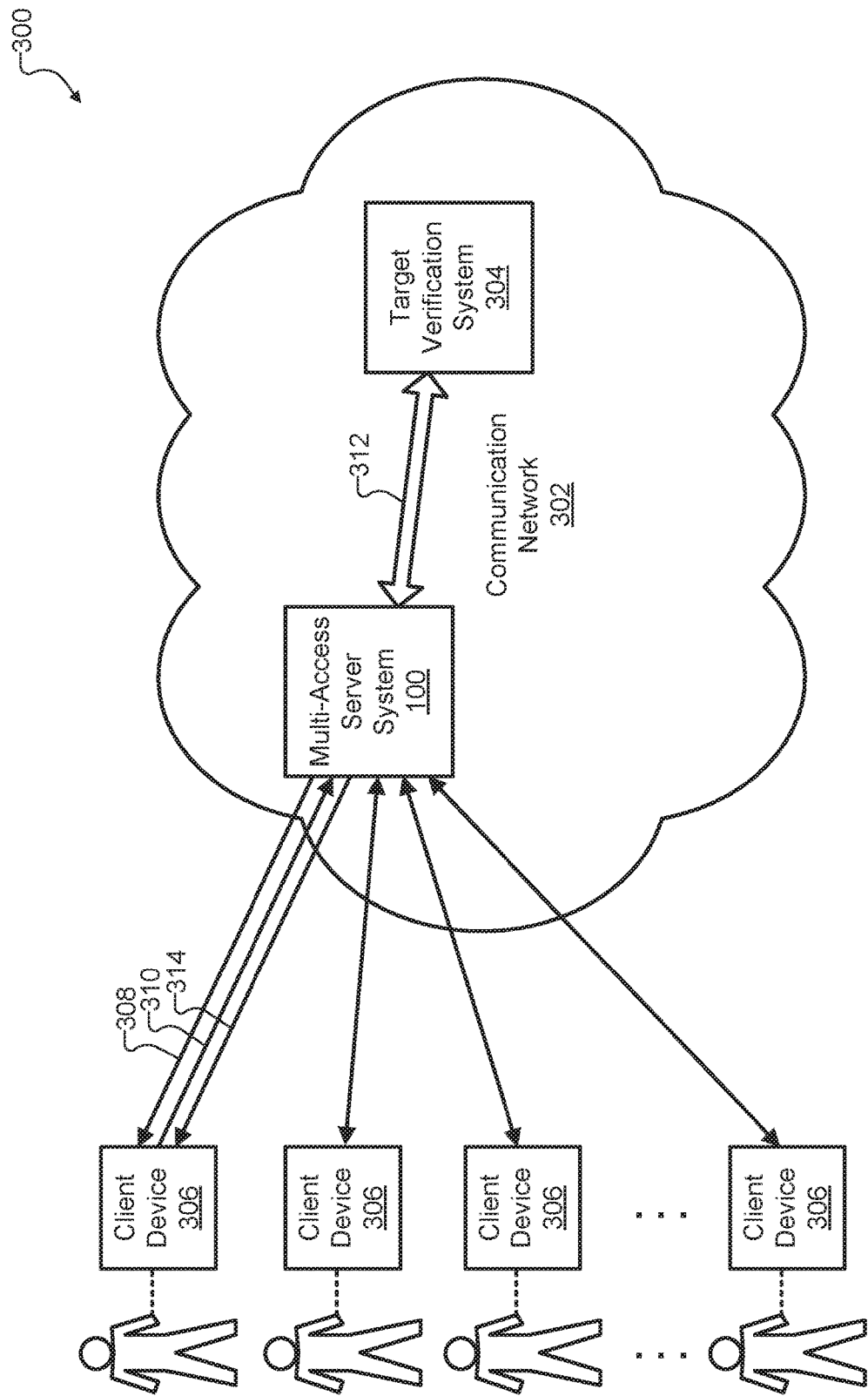
FIG. 3 shows an illustrative configuration in which the multi-access server system of FIG. 1 may operate to provide the asynchronous massive multiplayer application according to embodiments described herein.

FIG. 3 shows an illustrative configuration 300 in which system 100 may operate to provide the asynchronous massive multiplayer application according to principles described herein. As shown, configuration 300 may include a communication network 302 on which system 100 is implemented along with a target verification system 304 that is shown to be separate and distinct from system 100 (although, as described below, this system may be integrated with system 100 in certain implementations). Various client devices 306 each associated with a different respective user may be communicatively coupled to system 100 in a manner that allows for the client devices to exchange data with system 100 in ways that will be described in more detail below. Each of the elements of configuration 300 will now be described in more detail.

System 100 was described structurally and functionally with respect to FIGS. 1 and 2, above. System 100 may be implemented by a computing system (e.g., a server, a blade server, an edge server, a set of servers at a single site, etc.) that includes a respective set of computing resources, that is accessible to multiple client devices 306 separate from system 100, and that is configured to facilitate execution of an asynchronous massive multiplayer application for client devices 306. As mentioned above, implementations of system 100 included within a provider network of communication network 302 (e.g., so as to be near the edge of communication network 302 where client devices 306 connect to the network) may be implemented by MEC servers, while implementations of system 100 that are further from the edge of the provider network (e.g., within external networks that are accessible to client devices 306 by way of the provider network) may be implemented by cloud servers.

The communicative and geographical proximity of a given implementation of system 100 to a client device 306 engaged in an asynchronous massive multiplayer application hosted by the system 100 may at least partially determine the performance that the system 100 is capable of providing for the application. For instance, a multi-access server system located near client devices 306 (e.g., a MEC server implementation) may be capable of processing trajectory data from the client device 306 and streaming video data with a lower latency than a multi-access server system that is located farther from client devices 306 (e.g., a cloud server implementation). A particular multi-access server system 100 may include a set of co-located computing resources (e.g., multi-access server modules, processors, CPUs, GPUs, memory, communication resources, etc.) such that the computing resources all communicate with a particular client device 306 with a similar transport latency and such that the particular multi-access server system 100 may be treated as a single, discrete entity for the purposes of executing the asynchronous massive multiplayer application.

Communication network 302 may represent various networks or parts of networks used to enable data communication between client devices 306 and system 100 or other servers that may communicate with client devices 306. To this end, communication network 302 may implement or employ any suitable communication technologies, devices, media, protocols, or the like as may serve a particular implementation. In some examples, communication network 302 may include a provider network and/or additional networks outside of the provider network (e.g., external networks associated with the Internet).

A provider network included within communication network 302 may be implemented as a provider-specific wired or wireless communications network (e.g., a cellular network used for mobile phone and data communications, a 5G network or network of another suitable technology generation, a cable or satellite carrier network, a mobile telephone network, etc.), and may be operated and managed by a provider entity such as a mobile network operator (e.g., a wireless service provider, a wireless carrier, a cellular company, etc.). The provider of the provider network may own or control all of the elements necessary to deliver communications services to users of user equipment devices such as client devices 306, including radio spectrum allocation, wireless network infrastructure, back haul infrastructure, customer care, provisioning of devices, and so forth.

In various examples, a provider network included within communication network 302 may include or consist of various network resources that may be associated with one or more multi-access servers such as MEC servers. In examples in which an implementation of system 100 is implemented within a provider network, system 100 may be implemented by one of these MEC servers and may include a communication interface configured to exchange data, (e.g., by way of the provider network within which the MEC server is implemented) with each of client devices 306 that are engaged in the massive multiplayer application. For instance, one or more radio access network (RAN) resources may directly communicate with client devices 306 and may provide access to MEC servers integrated with the RAN resources, one or more transport access point (TAP) resources may communicate with client devices 306 indirectly (e.g., by way of the RAN resources) and may provide access to additional integrated MEC servers, one or more service access point (SAP) resources may communicate with client devices 306 indirectly (e.g., by way of the RAN and/or TAP resources) and may provide access to still other integrated MEC servers, and so forth. In all of these examples, any of the MEC servers integrated within the network resources may implement system 100 as shown in configuration 300.

Along with a provider network such as has been described, communication network 302 may further include elements of one or more additional networks external to the provider network (e.g., third party networks associated with the Internet, etc.). In certain examples, an implementation of system 100 may be implemented external to the provider network (e.g., within a cloud server rather than a MEC server of the provider network, etc.). For instance, certain implementations of system 100 could be implemented by cloud servers operated by cloud computing enterprises such as VERIZON (e.g., VERIZON Cloud), AMAZON (e.g., AMAZON Web Services (AWS)), MICROSOFT (e.g., MICROSOFT Azure), GOOGLE (e.g., GOOGLE Cloud Platform (GCP)), ORACLE (ORACLE Cloud), or the like. As has been described, the performance (e.g., the latency performance, the video quality that can be provided, etc.) may be at least somewhat compromised when system 100 is implemented by a cloud server on an external network instead of being implemented by a MEC server within the provider network. This is due in part to much lower transport latency associated with the MEC server due to its geographical proximity to the client devices, as will be described and illustrated in more detail below.

Target verification system 304 may be configured to determine and report an outcome of a massive multiplayer application based on target verification data indicative of whether each of the respective virtual objects is successfully directed to the target (e.g., by hitting or otherwise connecting with or achieving the target). As shown, target verification system 304 may be communicatively coupled to system 100 by way of communication network 302, and, as will be described in more detail below, may receive (e.g., via communication network 302) target verification data that allows target verification system 304 to determine whether each individual client device 306 has successfully performed a task such as directing a virtual object to hit a target. Target verification system 304 may track statistics for various client devices such that, along with indicating whether each player associated with each client device 306 successfully directed a virtual object to the target, target verification system 304 may indicate an overall winner of the game. Similarly, target verification system 304 may track scores to create a leaderboard of the most successful players and so forth in certain examples.

Target verification system 304 is shown within configuration 300 as being implemented within communication network 302 along with system 100. As such, target verification system 304 may likewise be implemented by a MEC server integrated with the provider network, by a cloud server on an external network and accessible via the Internet, or by another suitable server communicatively coupled to system 100 by way of communication network 302. In certain implementations, as shown, target verification system 304 may be a separate and distinct system from system 100. For instance, a single target verification system 304 may provide data services for multiple implementations of system 100 each hosting different asynchronous massive multiplayer applications. In other implementations, target verification system 304 may be integrated with system 100, such as being implemented by the same computing resources (e.g., implemented on the same MEC server or cloud server as is implementing system 100).

In certain implementations, target verification system 304 may include or be associated with a computer vision system (e.g., a MEC-based computer vision system) that facilitates augmented reality operations including by helping determine whether each virtual object that has been launched from each respective location successfully hits, reaches, connects with, or otherwise achieves the target. In these examples, augmented reality or other similar technologies may leverage computer vision processing capabilities of the computer vision system to allow each user to play an augmented reality version of the asynchronous massive multiplayer application, as will be described in more detail below. For example, an augmented reality game instance may be executed by multiple client devices 306 each configured to capture data depicting an on-screen object's trajectory, a target verification system, and an implementation of system 100 communicatively coupled with the client devices and the target verification system.

While only a few client devices 306 are shown in the figures, thousands or more such devices may actually be engaged in the asynchronous massive multiplayer application in certain examples (e.g., 100,000 devices in an example involving a large stadium and participants watching an event from home, etc.). Each client device 306 may be implemented as any computing device configured to connect to communication network 302 and to execute an asynchronous massive multiplayer application hosted by system 100 to allow a respective user of the client device 306 to asynchronously engage in the application along with various other users of other client devices 306. For example, a client device 306 may be implemented as a mobile device (e.g., a smartphone or tablet device, a smart watch or other wearable, etc.) that is carried by a user when attending a real-world event (e.g., a football game or other real-world event described herein or as may serve a particular implementation). In certain examples, a user may not attend the real-world event in person but, rather, may experience the event from a separate location (e.g., watching a football game from home on a television, etc.). In these examples, a client device 306 may be implemented by a less mobile type of device such as a personal computer (e.g., a desktop or laptop computer, etc.), a television, or another suitable device.

All the components shown in FIG. 3, including system 100, target verification system 304, and client devices 306 may be communicatively coupled with one another (e.g., by way of communication network 302) in the ways described above. Arrows representative of certain communications between these components are shown in FIG. 3. In particular, several communications 308-314 are explicitly labeled in FIG. 3 to illustrate how system 100 may provide an asynchronous massive multiplayer application with respect to one particular client device 306 (hereafter, the client device 306). Each of communications 308-314 will now be described in more detail with respect to FIGS. 4-7, which depict various aspects of the "Ultra Toss" football throwing game that has been used as an example throughout this description. It will be understood that various other types of asynchronous massive multiplayer applications (e.g., other applications mentioned herein or alternative applications as may serve a particular implementation) may similarly be implemented in place of the "Ultra Toss" game. Additionally, while detailed communications are only labeled for one of client devices 306, it will be understood that analogous communications with each of the other client devices 306 may also be performed.

For communication 308, system 100 may send out information configured to initiate the asynchronous massive multiplayer application in any manner as may serve a particular embodiment. For example, in certain implementations, system 100 may generate a notification designating a time when the users are to perform the asynchronous attempts to direct their respective virtual objects (e.g., virtual footballs) to the target (e.g., virtual pickup truck on the field). System 100 may provide the notification to each of the plurality of client devices 306, including providing the notification to the client device 306 by way of communication 308, as shown in FIG. 3. The client devices 306 may then engage in the massive multiplayer application based on user input from the respective users in response to the notification.

Figure 4:
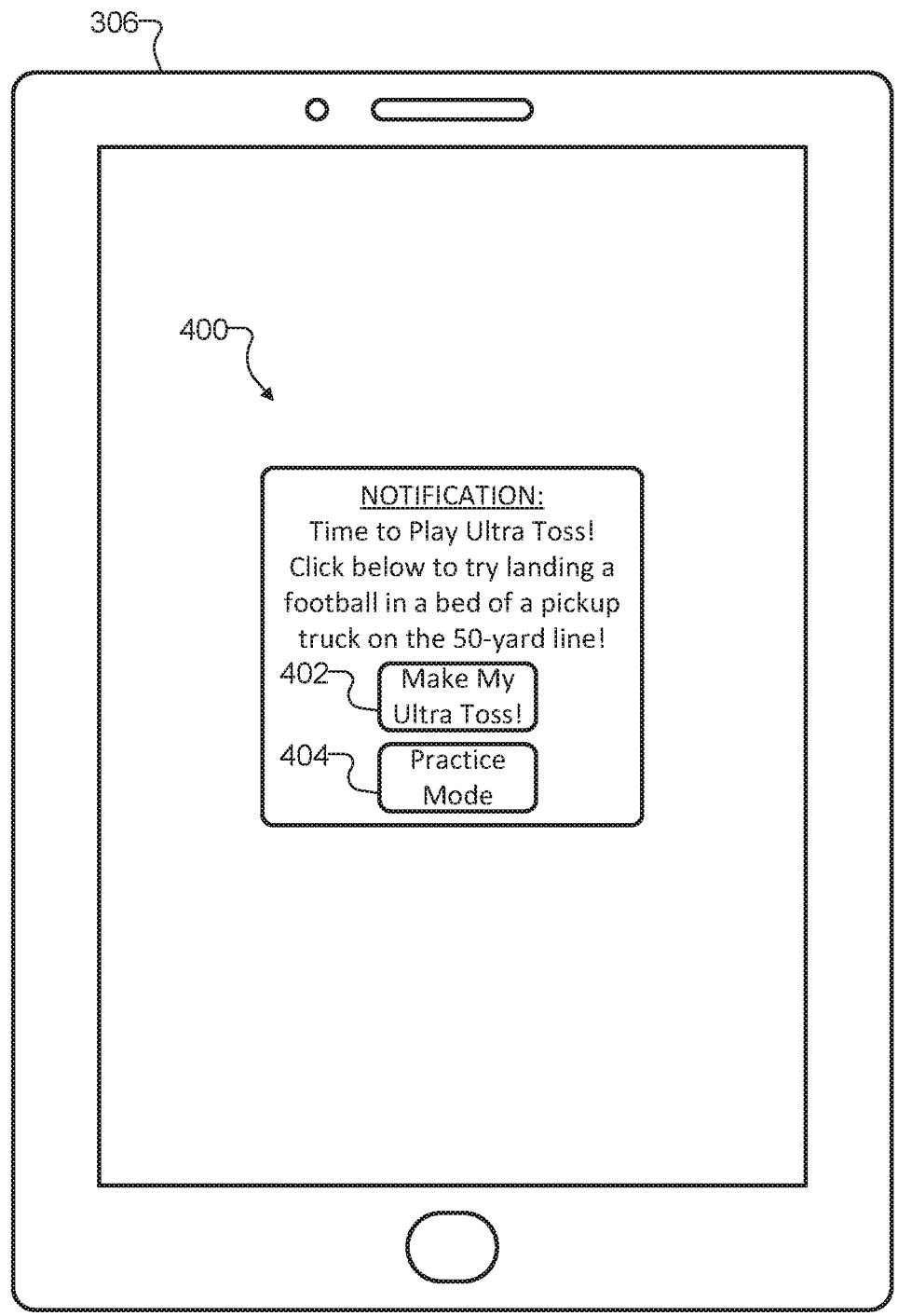
FIG. 4 shows an illustrative client device depicting a notification designating a time when users of a massive multiplayer application are to perform an action according to embodiments described herein.

To illustrate, FIG. 4 shows an illustrative client device 306 depicting a notification 400 designating a time when users of an "Ultra Toss" massive multiplayer game are to perform an action. Specifically, as shown in this example, notification 400 indicates that the designated time is right now ("Time to Play Ultra Toss!") and the action the user is invited to perform is to launch a virtual football to try to hit a virtual pickup truck target on the football field ("Click below to try landing a football in a bed of a pickup truck on the 50-yard line!"). Notification 400 may be pushed to registered user devices 306 (e.g., devices that have downloaded a particular app and/or otherwise registered to play the game), to all devices that are connected to a particular provider network and/or located at a particular site (e.g., all mobile devices on the VERIZON network that are present at a site of a football stadium, etc.), or to another suitable set of devices. In some examples, notification 400 may be transmitted during a particular segment of the half-time show, during a TV commercial break, as a celebratory recognition that the home team has scored a touchdown, or at any other suitable time associated with any aspect of the real-world event (e.g., the football game that is taking place).

It will be understood that notification 400 illustrates only one example of a time that may be designated and an action that the user may be invited to perform. In other examples, similar notifications may designate future times or larger time ranges that will cause the game to be played more asynchronously (e.g., rather than all the players making their object launch attempts at approximately the same time during the half time show or the like). For example, a notification analogous to notification 400 may be communicated by system 100 near the beginning of the football game and may invite users to asynchronously play the "Ultra Toss" game at any time during the first half of the game. This may allow players a chance to practice and improve their skill, to play several times during the half while gameplay is suspended (e.g., between downs, during timeouts, etc.), and so forth. In this example, rather than everyone playing the game during the half-time show, a segment of the half-time show may include recognizing one or more winners of the game who have successfully landed their footballs in the truck (or who have gotten the closest to doing so), as well as providing the videos to each client device 306 depicting all the asynchronous attempts of all the players while emphasizing each user's own football in the ways described herein (e.g., depicting all the attempts taken over the entire first half of the game as if they occurred simultaneously).

Notification 400 is shown to include two options for how the user may proceed if he or she wishes to engage in the "Ultra Toss" asynchronous massive multiplayer application. An option 402 ("Make My Ultra Toss!") may be selected for the user to officially make his or her attempt in an implementation in which each user is limited to one official attempt. In some examples, it may be desirable to limit the number of official attempts that a user may make (e.g., the attempts that will count toward winning the game and will be depicted on other user's videos) in order to limit the amount of processing system 100 has to do for the potentially thousands of attempts that will all be depicted in each of the thousands of videos system 100 is tasked with rendering. However, it may be desirable for a user to be able to practice his or her object launching (e.g., throwing) technique before logging his or her official attempt or attempts. Accordingly, an option 404 ("Practice Mode") may take the user to a practice mode in which the user can freely toss virtual footballs to try to hit the designated target or other targets (e.g., including user-selected targets, etc.) without it counting as his or her official attempt. Accordingly, these practice attempts may not be viewed by other users or included in videos seen by the other users in the same way as the official attempt.

While notification 400 is shown to be presented on client device 306 based on communication 308 from system 100, it will be understood that users may also be notified or invited to engage in the asynchronous massive multiplayer application (e.g., to play the game) in other ways in certain implementations. For instance, in addition or as an alternative to system 100 transmitting notifications to each client device 306, messaging displayed at the stadium (e.g., on a jumbotron or the like), announcements made by officials associated with the event, a notification displayed on television screens of people viewing from home, or other types of notifications may also indicate to users when it is time to engage in the massive multiplayer application.

Returning to FIG. 3, in response to being notified in any of the ways described above (e.g., including by selecting one of options 402 or 404 of notification 400), the user of the client device 306 may asynchronously (e.g., whenever the user desires) provide input data to the massive multiplayer application to make an attempt to perform the task. For instance, the user may input to client device 306 various parameters such as the horizontal aim, vertical aim, power, spin, and/or any other suitable parameters described herein or as may serve a particular implementation. Based on such user input, the client device 306 may provide to system 100 trajectory data representative of the user's asynchronous attempt to direct his or her own virtual object to the target.

Communication 310 from the client device 306 to system 100 may include this trajectory data, and may take any form described herein or as may serve a particular implementation. Based on trajectory data obtained by way of communication 310, system 100 may determine a virtual trajectory for the user's asynchronous attempt to direct his or her respective virtual objects to the target in any of the ways described herein.

Figure 5:
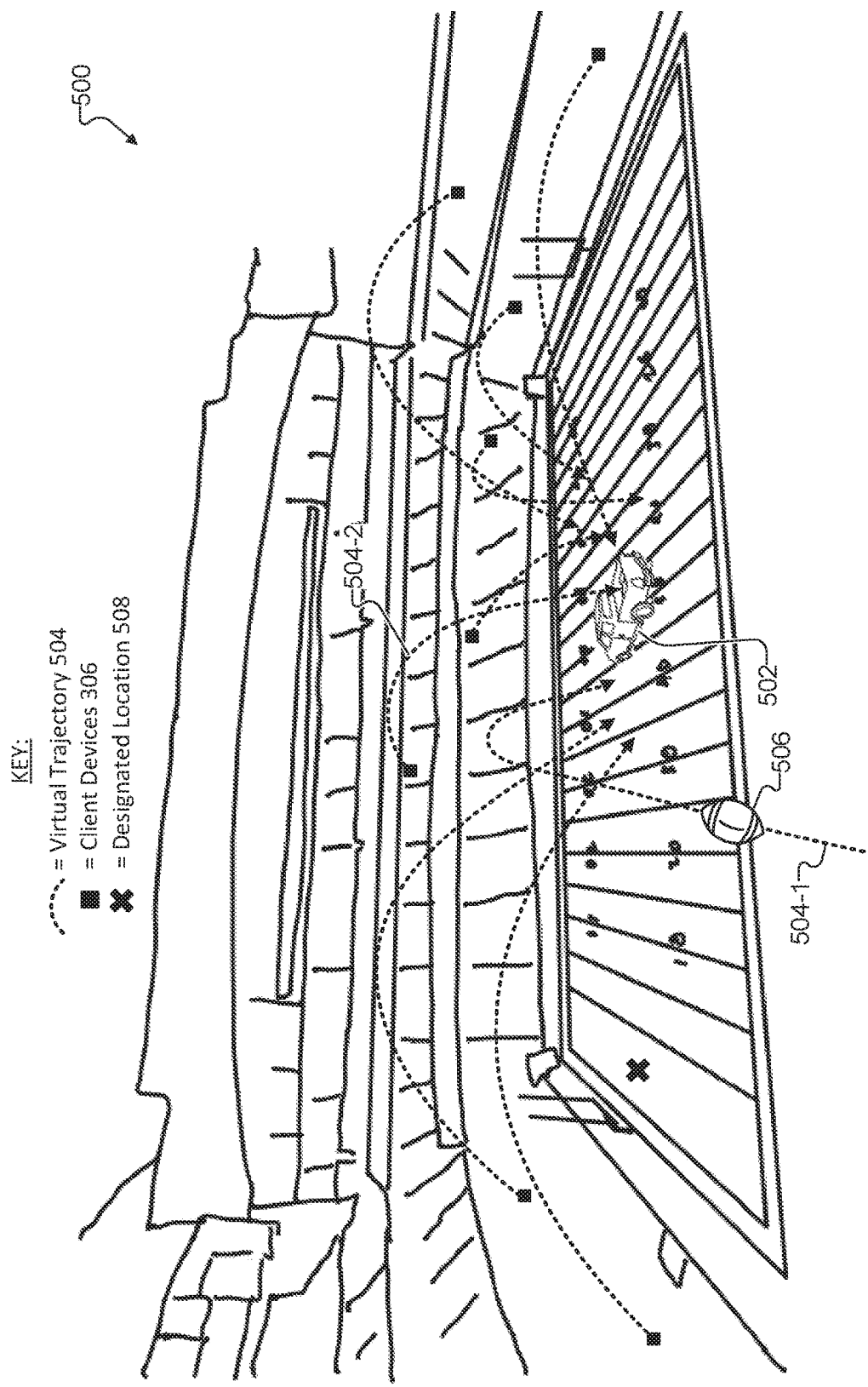
FIG. 5 shows an illustrative massive multiplayer application taking place at a real-world event according to embodiments described herein.

To illustrate the asynchronous attempts represented by trajectory data included within communication 310 and other similar communications from other client devices 306, FIG. 5 shows an illustrative massive multiplayer application taking place at a real-world event 500 according to principles described herein. As has been mentioned, various types of massive multiplayer applications may be carried out at various types of real-world events. In this example, however, it is shown that real-world event 500 is a sporting event (e.g., an American football game) taking place at a venue accommodating a plurality of spectators watching the sporting event in person (e.g., a large football stadium that may be capable of accommodating many tens of thousands of spectators for a particular football game). In this example, the users of the plurality of client devices 306 include spectators (e.g., football fans at the game) watching the sporting event in person, and each of the respective virtual objects is a virtual instance of an object associated with the sporting event (e.g., a virtual football in this example, just as a virtual instance of an object associated with a basketball game might be a virtual basketball, etc.).

As shown, a virtual pickup truck 502 is located at the center of the football field to serve as a target in this example. Additionally, as indicated by the KEY included at the top of FIG. 5, dotted lines in FIG. 5 illustrate virtual trajectories 504 of various attempts to direct respective virtual objects (e.g., virtual footballs) to the virtual pickup truck 502 target by users of client devices 306 (e.g., illustrated as small black squares in FIG. 5). While only a few virtual trajectories 504 are explicitly depicted in FIG. 5, it will be understood that thousands or more such trajectories may be present in certain examples. One particular virtual trajectory 504-1 shows a virtual object 506 (e.g., a virtual football 506) associated with the client device 306 and that has recently been launched. Virtual football 506 will be shown to follow virtual trajectory 504-1 to land near virtual pickup truck 502 on the football field. Another particular trajectory 504-2 originating from a mobile device 306 on the opposite side of the stadium is also called out in FIG. 5 to show a winning attempt that actually manages to hit the target (e.g., landing the virtual football in the bed of virtual pickup truck 502).

In certain examples, the target that each user is to try to hit with his or her respective virtual object may be a virtual target that is positioned at the real-world location by being presented to the users (e.g., by their respective client devices 306) as an augmented reality object that is virtually located at the real-world location. For example, as shown in FIG. 5, the target that each spectator in the football stadium is trying to hit with his or her virtual football is virtual pickup truck 502, which is virtually located at a real-world location on the football field by being presented that way on each mobile device 306 using augmented reality technology. The real-world location at which the target is positioned may be a central location (e.g., on the 50-yard line) visible to the plurality of spectators within the venue during the sporting event or another suitable (e.g., central or non-central) location.

The augmented reality technologies used to present virtual pickup truck 502 at the real-world location on the football field may be implemented in any suitable way by individual client devices 306, by system 100, by other servers accessible to client device 306 on communication network 302 (e.g., a dedicated computer vision system implemented by a same or a different MEC server as may be implementing system 100), by a combination of these devices and/or systems, or by any other suitable systems or devices as may serve a particular implementation. For example, the client device 306 may capture an image associated with the real-world event (e.g., an image depicting part or all of the football field from a perspective of the client device 306, as shown by FIG. 5) and may either process that image locally or provide the image to another system (e.g., system 100, a MEC-based computer vision system, etc.) for processing.

The processing of the image may include identifying, within the image, one or more markers associated with the football field (e.g., corners of the field, markings on the field such as yard lines, etc.) using computer vision, machine learning, and so forth. Upon identifying the field, the processing may further include identifying a particular real-world location on the football field, such as a real-world location on the field (e.g., at the center of the 50-yard line). At this real-world location, the system or device implementing the augmented reality may overlay a virtual object (e.g., virtual pickup truck 502) onto the image to form an augmented image showing the field together with the overlay of, for example, virtual pickup truck 502 at the real-world location on the field.

By presenting this augmented reality image to a user (e.g., after generating the image or receiving the image from a MEC-based server or other server that generates the augmented reality image), the mobile device 306 may make it appear to the user as if the augmented reality object (e.g., virtual pickup truck 502) is actually present on the real-world football field as the user takes aim and provides his or her user input representative of his or her asynchronous attempt to direct virtual football 506 to the target of virtual pickup truck 502. Augmented reality technologies, computer vision technologies, physics simulation technologies, and so forth may then be used to determine the virtual trajectory 504-1 of virtual football 506 in the ways described above. The other trajectories 504 may similarly be determined and the respective attempts of each user engaged in the game may be presented to the user together with his or her own attempt to direct the virtual object to the target. In certain examples, other augmented reality technologies (or technologies associated with other types of extended reality) may be used in addition to or as alternatives to the augmented reality technologies that have been described.

As has been mentioned, virtual pickup truck 502 represents just one example of a suitable augmented-reality-based target that may be employed in a particular implementation. In other implementations, a different virtual object or a real-world object (e.g., one of the actual goal posts, a moving target on the field such as an actual mascot running around on the field, etc.) may instead serve as the target.

All of the virtual trajectories 504 explicitly shown in FIG. 5 originate from locations in the stands of the stadium where spectators are observing the game with their client devices 306. In certain examples, the asynchronous massive multiplayer application may be a co-located application configured for use only by event attendee users physically located at different locations at a site of the real-world event (e.g., configured to be played only by spectators of the sporting event who are physically present at the event). In these examples, virtual object launch locations corresponding to the asynchronous attempts by the event attendee users to direct the respective virtual objects (e.g., virtual footballs) to the target (e.g., virtual pickup truck 502) may be disposed at different locations at the site of the real-world event. For instance, the virtual object launch locations may be the different locations (e.g., different seats in the stands) where the event attendee users are physically located at the site of the real-world event (e.g., at a stadium where the football game event is taking place).

In other examples, asynchronous massive multiplayer applications may be configured to be played by users who are not physically present at a particular real-world event (e.g., in addition to or instead of being played by the users who are physically present). For example, an asynchronous massive multiplayer application may be implemented as a distributed application configured for use by one or more remote users physically located at different locations at sites remote from a site of the real-world event (e.g., watching the football game on television from their homes, etc.).

In these distributed application examples, users may be invited to participate in the asynchronous massive multiplayer application together with or instead of the spectators present at the game. Instead of each user attempting to direct a virtual object to the target from a physical location where the user is actually located (e.g., as shown by the attempts illustrated in FIG. 5), remote users who are not physically present for the sporting event may virtually perform their attempts to direct their respective virtual objects to the target from a virtual object launch location disposed at a designated location at the site of the real-world event (which designated location may of course be remote from the sites at which the remote users are physically located, such as in their homes). For example, as indicated by the KEY in FIG. 5, a designated location 508 where remote viewers can virtually stand when making their attempts to direct their footballs into virtual pickup truck 502 may be located on one end of the football field (depicted by a black 'X'). In certain implementations, even users who are physically present at the site of the real-world event may also make their attempts from a location such as designated location 508 (e.g., rather than from their actual physical location in the stands).

Figure 6:
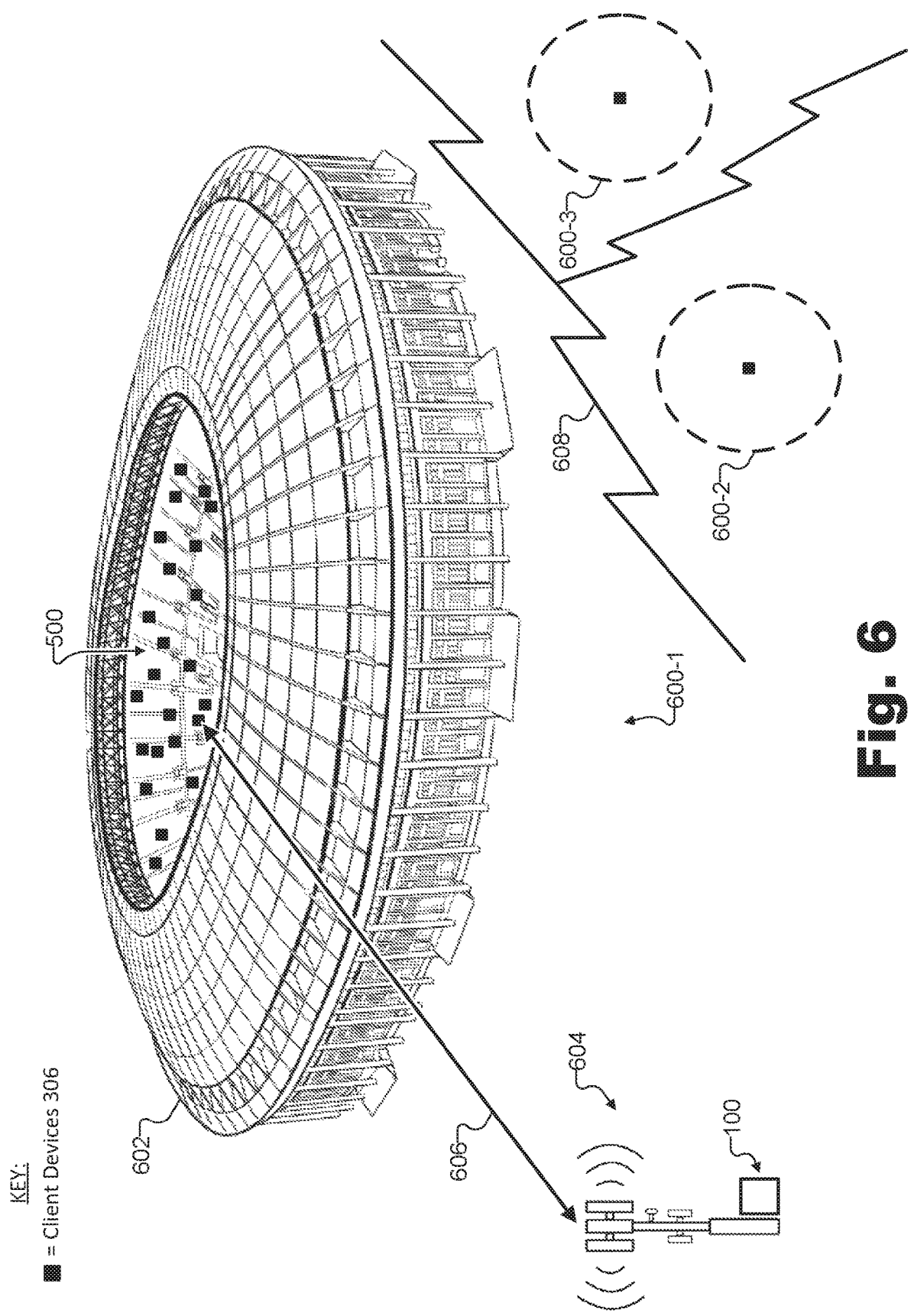
FIG. 6 shows illustrative geographical aspects of a plurality of different sites associated with the performance of a massive multiplayer application according to embodiments described herein.

FIG. 6 shows illustrative geographical aspects of a plurality of different sites associated with the performance of asynchronous massive multiplayer applications. More particularly, FIG. 6 shows various sites 600 (e.g., sites 600-1 through 600-3) at which various client devices 306 engaged in a particular asynchronous massive multiplayer application may be located, as well as an illustrative geographical relationship between an implementation of system 100 and a real-world event.

As shown in FIG. 6, site 600-1 is a site of real-world event 500, which, as described above, may represent a sporting event taking place at a venue 602 accommodating a plurality of spectators watching the sporting event in person. For example, venue 602 is shown to be a large American football stadium within which various client devices 306 shown as small black squares (see KEY) are contained during a football game (i.e., during real-world event 500 in this example).

Venue 602 may be within a coverage area of a provider network included within communication network 302 and system 100 may be implemented as a MEC server located proximate to venue 602. For example, as shown, system 100 may be located on-site (e.g., in the parking lot or otherwise directly adjacent to venue 602) or at a location of a nearby network element 604 (e.g., a RAN resource, a TAP resource, a SAP resource, etc.) that is a relatively small distance 606 from venue 602 (e.g., less than a mile, less than a few miles, etc.). Accordingly, users of client devices 306 at site 600-1 may include spectators watching the sporting event in person, and these users may all be co-located near network element 604 and its implementation of system 100.

In contrast, a few other sites 600 (e.g., sites 600-2 and 600-3) are also shown in FIG. 6 that, as illustrated by scale break symbols 608, may be remote from site 600-1 and/or from one another. For example, site 600-2 may be associated with a home of a first spectator who is associated with a client device 306 and is watching a broadcast of real-world 500 on television. Similarly, site 600-3 may be associated with a home of a second spectator who is associated with a different client device 306 and is also watching the broadcast of real-world 500. In some examples, sites 600-2 and 600-3 may be remote (e.g., several miles, hundreds of miles, thousands of miles, etc.) from site 600-1 of real-world event 500 and/or from one another. As such, users located at sites 600-2 and 600-3 may not enjoy the same low latency provided by the implementation of system 100 shown to be the short distance 606 from venue 602, but may still engage in the asynchronous massive multiplayer application taking place at real-world event 500 remotely (e.g., by a distributed implementation of the asynchronous massive multiplayer application that allows the users to make asynchronous attempts from designated location 508, as described above).

Returning to FIG. 3, after system 100 provides the notification to initiate the asynchronous massive multiplayer application (communication 308), obtains the trajectory data from client devices 306 (communication 310), and determines the virtual trajectories (e.g., virtual trajectories 504 shown in FIG. 5), system 100 may be configured to assess each virtual trajectory in any suitable way. For instance, system 100 may identify a criterion for determining whether each of the respective virtual objects is successfully directed to the target, determine whether each of the plurality of virtual trajectories complies with the identified criterion, generate (e.g., based on the determining of whether each of the plurality of virtual trajectories complies with the identified criterion) target verification data, and provide the target verification data to target verification system 304 by way of communication 312.

As described above, target verification system 304 may be configured to determine and report an outcome of the massive multiplayer application based on received target verification data. As such, the target verification data included within communication 312 may, in certain examples, be indicative of whether each of the respective virtual objects is successfully directed to the target. This may allow target verification system 304 to track which client devices 306 have completed their attempts, how well each client device 306 performed at its respective attempt, which client device 306 is determined to be the winner of the massive multiplayer application, and so forth. In other examples, the target verification data included within communication 312 may represent the virtual trajectories determined by system 100 such that target verification system 304 may assess the trajectories and determine the outcome of each trajectory (e.g., whether the virtual object hit the target, how close the virtual object was to the virtual target, etc.) itself along with performing other tracking, scoring, and monitoring operations described above.

After the virtual trajectories have been determined and subsequent to or while the trajectories are being evaluated, assessed, and/or verified by system 100 and/or target verification system 304, system 100 may render one or more videos to be streamed back to client device 306 as communication 314. Some videos rendered by system 100 at this time may be generalized so as to be the same for all of client devices 306, while other videos may be customized to a particular attempt associated with a particular client device 306. The videos may be rendered based on the virtual trajectories that have been determined (e.g., the virtual trajectory of the user of the client device 306 as well virtual trajectories determined for the other users' attempts). As will be described in more detail below, certain videos rendered at this stage may concurrently depict some or all of the asynchronous attempts by the various client devices 306 to direct the respective virtual objects to the target.

Communication 314 is shown to be provided by system 100 to the client device 306 and may include data representative of the videos rendered by system 100 either for general use or for the client device 306 in particular. For example, at communication 314, system 100 may stream to the client device 306 (e.g., by way of a communication interface of system 100 and by way of communication network 302) a video that is customized to emphasize an attempt of the user of the client device 306 over other asynchronous attempts by other users of other client devices. For example, this emphasis may be implemented based on the vantage point from which the video is rendered (e.g., a vantage point that specifically follows the virtual trajectory of the user's specific virtual object), based on highlighting using coloring or other graphical effects (e.g., the user's specific virtual object may be a different color than other virtual objects, may leave a visible trail along the trajectory, etc.), or based on other suitable emphasis techniques (e.g., arrows, etc.) to make it easy for the user to differentiate his or her own virtual object from the virtual objects of other users. Other custom or general videos may also be provided.

Figure 7:
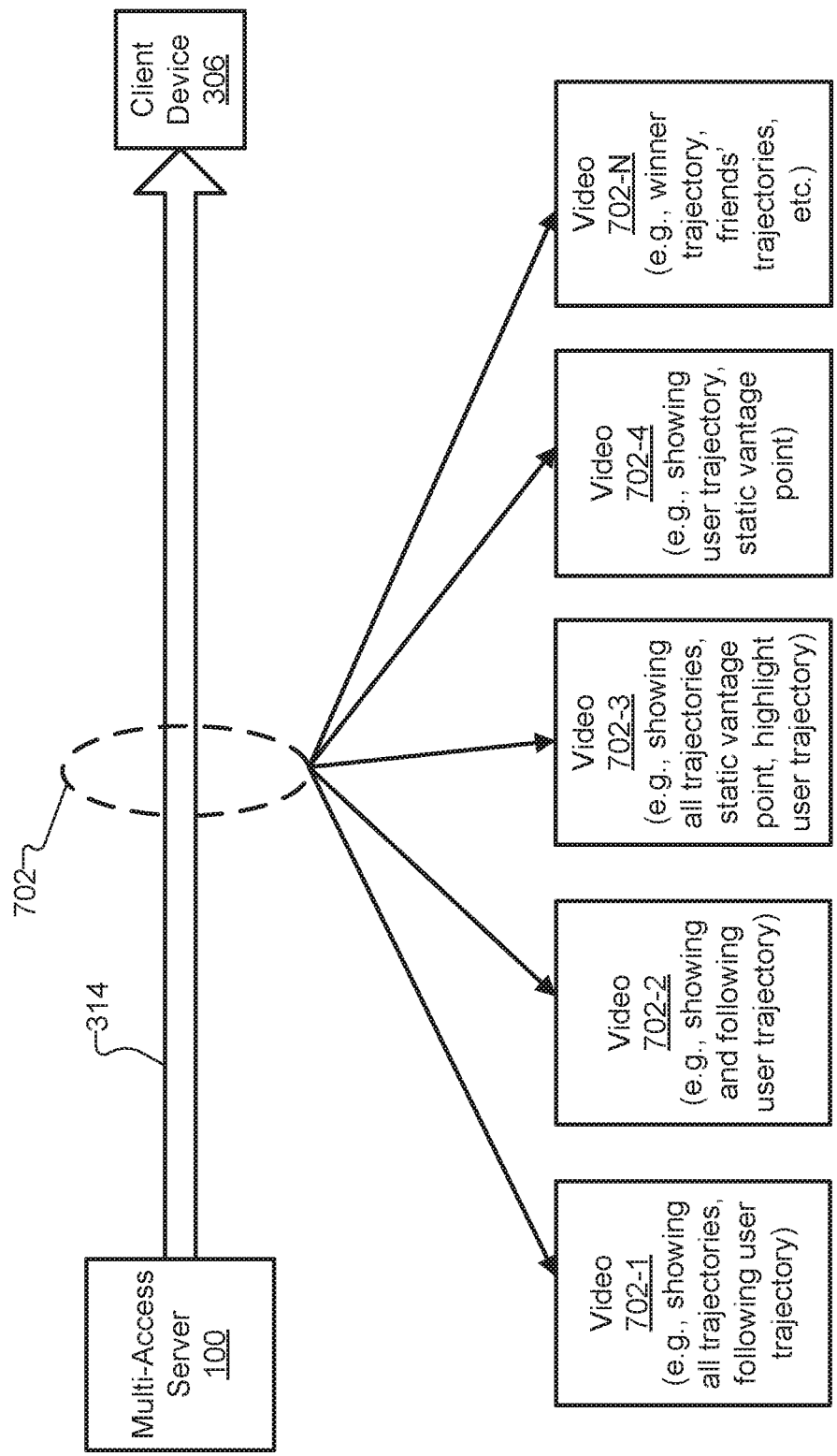
FIG. 7 shows illustrative streaming data transmitted from an illustrative implementation of the multi-access server system of FIG. 1 to an illustrative client device according to embodiments described herein.

To illustrate, FIG. 7 shows illustrative streaming data transmitted from system 100 to the client device 306 as communication 314. As shown, included within communication 314 are a plurality of example videos 702 (e.g., videos 702-1 through 702-N). Each of videos 702 may be rendered by system 100 (e.g., by the powerful resources of a MEC server or a cloud server or the like) such that, when received by client device 306, no physics simulation, frame rendering, or other such processing is required to display the video 702. To the contrary, upon receiving the stream of communication 314, the client device 306 may be able to present the rendered video in the same manner as a video might be presented when received from a commercial video service or website.

The different videos 702 included within one particular communication 314 to one particular client device 306 may include any suitable general or customized videos depicting any suitable asynchronous attempts to perform tasks associated with a massive multiplayer application in any suitable way as may serve a particular implementation. In some examples, each of the videos 702 streamed to the client device 306 within communication 314 may be custom videos rendered specifically for this specific client device 306. As such, system 100 may render several distinct videos for each of the potentially thousands of client devices 306 that are engaged in the asynchronous massive multiplayer application.

Video 702-1 may be a custom video rendered by system 100 and streamed to the client device 306. Video 702-1 may be customized to emphasize an attempt of a user of the client device 306 to direct a particular virtual object to the target (e.g., an attempt to throw football 506 to hit virtual pickup truck 502) in any of the ways described herein. For example, as indicated, video 702-1 may concurrently depict all of the asynchronous attempts by all of the users (e.g., "showing all trajectories," similar to what is depicted in FIG. 5), but may emphasize the user's attempt over the other attempts by concurrently depicting all the attempts from a moving vantage point ("following user trajectory") that follows the user's particular virtual object (e.g., football 506) on a virtual trajectory of the particular virtual object (e.g., virtual trajectory 504-1).

Video 702-2 may be rendered by system 100 to also depict an attempt of the user to direct a respective virtual object to the target (e.g., to direct virtual football 506 to hit virtual pickup truck 502), but may abstain from concurrently depicting attempts by the other users. For example, as indicated ("showing and following user trajectory"), video 702-2 may abstain from depicting more attempts than just the one attempt of the user to direct his or her respective virtual object to the target, but may likewise use the moving vantage point that follows behind the user's object. The streaming of communication 314 in FIG. 7 may include streaming video 702-2 to the client device 306 just as similar videos that each depict only one other respective attempt may be provided to other client devices 306.

Video 702-3 may be a video that, similar to video 702-1, concurrently depicts all of the attempts of all of the users to perform the task (e.g., to direct respective virtual footballs to hit the virtual truck, etc.). However, as indicated ("showing all trajectories, static vantage point, highlight user trajectory"), while video 702-1 may employ a vantage point that follows the user's specific virtual object on its virtual trajectory, video 702-3 may instead employ a static vantage point (e.g., an overhead vantage point, a vantage point on the field near virtual pickup truck 502 that is looking out towards the stands, etc.). As such, the emphasizing of the virtual object associated with the specific client device 306 in video 702-3 may be performed differently than video 702-1. For example, user trajectory 504-1 may be highlighted using a different color, a trail (e.g., of light, of smoke, of glitter, etc.) left behind virtual football 506, an arrow tracking virtual football 506 and continuously pointing to it, or another suitable way of highlighting that may serve a particular implementation.

Video 702-4 may be similar to video 702-2 but from a different vantage point. For example, as indicated ("showing user trajectory, static vantage point"), video 702-4 may, like video 702-2, only depict the attempt of the specific user of the client device 306 (e.g., abstaining from depicting the attempts of all the other users). For video 702-4, however, the attempt may be depicted from a static vantage point such as where the user is sitting, a vantage point on the field, a vantage point above the field, etc.).

Video 702-N may represent one or more other videos that may be rendered by system 100 and provided to client device 306 in various implementations. For instance, as indicated ("winner trajectory, friends' trajectories, etc."), video 702-N may be rendered to show non-customized depictions of one or more trajectories such as trajectories of the winner or others on a leaderboard. In other examples, video 702-N may be customized to show multiple trajectories, but only of a select group of people (e.g., friends or contacts of the user, people in a particular demographic selected by the user, etc.) rather than all of the users present. In other examples, video 702-N may show all of the attempts from a stationary vantage point (e.g., a neutral vantage point such as an overhead vantage point or a vantage point on the field) without emphasizing any particular attempt in the ways that have been described.

In some implementations, there may be a slight delay (e.g., 5-10 seconds) between when a user provides input to make his or her attempt to direct the virtual object to the target, and when system 100 has analyzed the user input, determined the virtual trajectory, rendered all the videos 702 relevant to the user, and begun streaming the videos within communication 314. This may be especially true for implementations that employ cloud computing servers on the Internet (e.g., rather than low-latency MEC servers on a provider network). A short, preloaded video (e.g., an advertisement, a slate video associated with the asynchronous massive multiplayer application, etc.) may be played during this short period of time before videos 702 begin playing. Additionally, if certain videos 702 take longer to render than others (e.g., videos 702 that depict all of the attempts rather than just one), these videos may begin streaming even while the other videos are still being rendered at system 100.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 8:
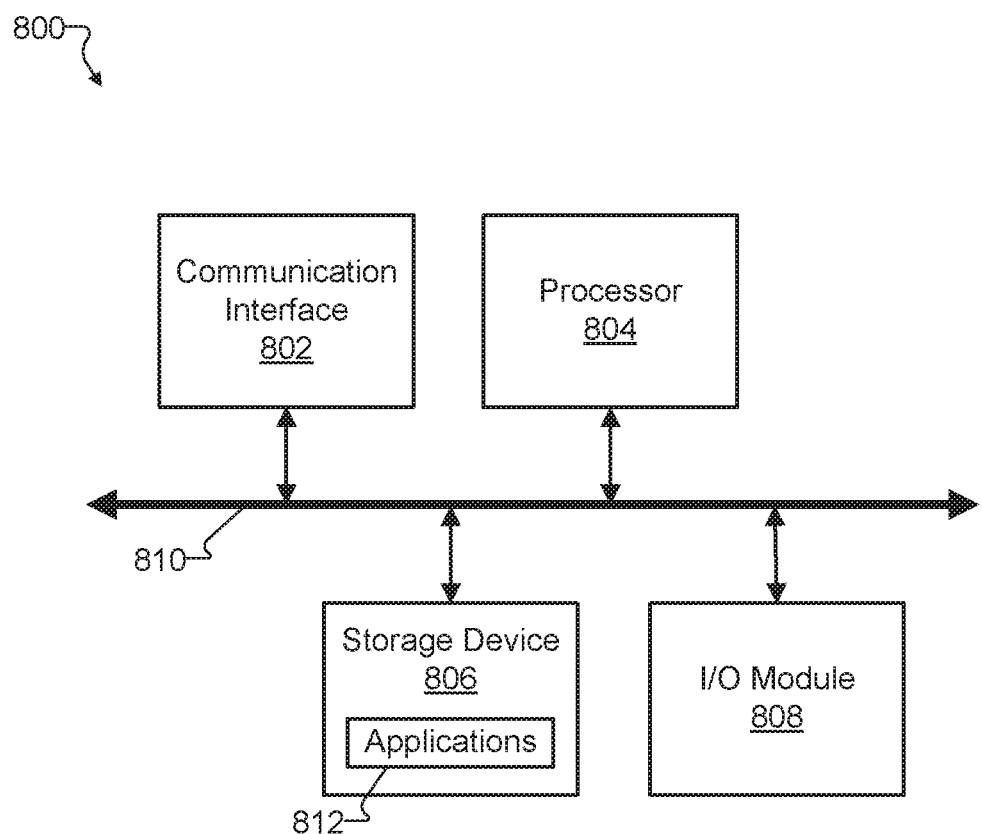
FIG. 8 shows an illustrative computing device according to embodiments described herein.

FIG. 8 shows an illustrative computing device 800 that may be specifically configured to perform one or more of the processes described herein. For example, computing system 800 may include or implement (or partially implement) a multi-access server system such as system 100 or any component included therein, a target verification system such as target verification system 304, a client device such as one of client devices 306, or any other computing systems or devices described herein.

As shown in FIG. 8, computing system 800 may include a communication interface 802, a processor 804, a storage device 806, and an input/output (I/O) module 808 communicatively connected via a communication infrastructure 810. While an illustrative computing system 800 is shown in FIG. 8, the components illustrated in FIG. 8 are not intended to be limiting. Additional or alternative components may be used in other embodiments. Components of computing system 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 800. For example, one or more applications 812 residing within storage device 806 may be configured to direct processor 804 to perform one or more processes or functions associated with processor 104 of system 100. Likewise, memory 102 of system 100 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   obtaining, by a multi-access server system from a plurality of client devices physically located at different respective locations at a site of a real-world event and engaged in a massive multiplayer application, trajectory data representative of asynchronous attempts, by users of the plurality of client devices, to direct respective virtual objects associated with the plurality of client devices from the respective locations of the client devices at the site of the real-world event to a target at a real-world target location at the real-world event;
   determining, by the multi-access server system and based on the trajectory data, a plurality of virtual trajectories for the asynchronous attempts to direct the respective virtual objects from the respective locations of the client devices at the site of the real-world event to the target at the real-world target location;
   rendering, by the multi-access server system based on the plurality of virtual trajectories, a plurality of videos that each concurrently depict the asynchronous attempts to direct the respective virtual objects to the target; and
   streaming, by the multi-access server system, different videos of the plurality of videos to different client devices of the plurality of client devices, wherein each particular video streamed to each particular client device is customized to emphasize, over other asynchronous attempts by other users of other client devices, an attempt of a user of the particular client device to direct a virtual object associated with the particular client device to the target.

2. The method of claim 1, wherein:
   the target is a virtual target that is positioned at the real-world target location by being presented to the users, by the plurality of client devices, as an augmented reality object that is virtually located at the real-world target location; and
   each client device of the plurality of client devices presents the virtual target at the real-world target location based on computer-vision processing of image data that depicts the real-world location and is captured by a respective camera associated with the client device.

3. The method of claim 1, further comprising:
   identifying, by the multi-access server system, a criterion for determining whether each of the respective virtual objects is successfully directed to the target;

determining, by the multi-access server system, whether each of the plurality of virtual trajectories complies with the identified criterion;

generating, by the multi-access server system and based on the determining of whether each of the plurality of virtual trajectories complies with the identified criterion, target verification data indicative of whether each of the respective virtual objects is successfully directed to the target; and providing, by the multi-access server system, the target verification data to a target verification system configured to determine and report an outcome of the massive multiplayer application based on the target verification data.

4. The method of claim 1, further comprising:

generating, by the multi-access server system, a notification designating a time when the users are to perform the asynchronous attempts to direct the respective virtual objects to the target; and providing, by the multi-access server system, the notification to each of the plurality of client devices;

wherein the client devices engage in the massive multiplayer application based on user input from the users in response to the notification.

5. The method of claim 1, wherein the massive multiplayer application is a co-located application configured for use only by event attendee users physically located at the site of the real-world event.

6. The method of claim 1, wherein:

the massive multiplayer application is a distributed application configured for use by event attendee users physically located at the site of the real-world event and by remote users physically located at sites remote from the site of the real-world event; and a virtual object launch location corresponding to respective asynchronous attempts by the remote users to direct respective virtual objects to the target is disposed at a designated location at the site of the real-world event, the designated location remote from the sites at which the remote users are physically located.

7. The method of claim 1, wherein:

the real-world event is a sporting event taking place at a venue accommodating a plurality of spectators watching the sporting event in person;

the users of the plurality of client devices include spectators of the plurality of spectators watching the sporting event in person;

each of the respective virtual objects is a virtual instance of an object associated with the sporting event; and the real-world target location is a location visible to the plurality of spectators within the venue during the sporting event.

8. The method of claim 1, wherein a particular video rendered by the multi-access server system and streamed to a particular client device is customized to emphasize an attempt of a user of the particular client device to direct a particular virtual object to the target by concurrently depicting the asynchronous attempts from a moving vantage point that follows the particular virtual object on a virtual trajectory of the particular virtual object.

9. The method of claim 1, further comprising:

rendering, by the multi-access server system based on the plurality of virtual trajectories, an additional plurality of videos that each depicts a different attempt of a different user to direct a respective virtual object to the target, and abstains from concurrently depicting more than one of the asynchronous attempts to direct the respective virtual objects to the target; and streaming, by the multi-access server system, different videos from the additional plurality of videos to the different client devices of the plurality of client devices.

10. A system comprising:

a memory storing instructions; and a processor communicatively coupled to the memory and configured to execute the instructions to:

obtain, from a plurality of client devices physically located at different respective locations at a site of a real-world event and engaged in a massive multiplayer application, trajectory data representative of asynchronous attempts, by users of the plurality of client devices, to direct respective virtual objects associated with the plurality of client devices from the respective locations of the client devices at the site of the real-world event to a target at a real-world target location at the real-world event;

determine, based on the trajectory data, a plurality of virtual trajectories for the asynchronous attempts to direct the respective virtual objects from the respective locations of the client devices at the site of the real-world event to the target at the real-world target location;

render, based on the plurality of virtual trajectories, a plurality of videos that each concurrently depict the asynchronous attempts to direct the respective virtual objects to the target; and stream different videos of the plurality of videos to different client devices of the plurality of client devices, wherein each particular video streamed to each particular client device is customized to emphasize, over other asynchronous attempts by other users of other client devices, an attempt of a user of the particular client device to direct a virtual object associated with the particular client device to the target.

11. The system of claim 10, wherein:

the target is a virtual target that is positioned at the real-world target location by being presented to the users, by the plurality of client devices, as an augmented reality object that is virtually located at the real-world target location; and each client device of the plurality of client devices presents the virtual target at the real-world target location based on computer-vision processing of image data that depicts the real-world location and is captured by a respective camera associated with the client device.

12. The system of claim 10, wherein the processor is further configured to execute the instructions to:

identify a criterion for determining whether each of the respective virtual objects is successfully directed to the target;

determine whether each of the plurality of virtual trajectories complies with the identified criterion;

generate, based on the determining of whether each of the plurality of virtual trajectories complies with the identified criterion, target verification data indicative of whether each of the respective virtual objects is successfully directed to the target; and provide the target verification data to a target verification system configured to determine and report an outcome of the massive multiplayer application based on the target verification data.

13. The system of claim 10, wherein:
the processor is further configured to execute the instructions to:
generate a notification designating a time when the users are to perform the asynchronous attempts to direct the respective virtual objects to the target, and provide the notification to each of the plurality of client devices;
the client devices engage in the massive multiplayer application based on user input from the users in response to the notification.

14. The system of claim 10, wherein the massive multiplayer application is a co-located application configured for use only by event attendee users physically located at the site of the real-world event.

15. The system of claim 10, wherein:
the massive multiplayer application is a distributed application configured for use by event attendee users physically located at the site of the real-world event and by remote users physically located at sites remote from the site of the real-world event; and
a virtual object launch location corresponding to respective asynchronous attempts by the remote users to direct respective virtual objects to the target is disposed at a designated location at the site of the real-world event, the designated location remote from the sites at which the remote users are physically located.

16. The system of claim 10, wherein:
the real-world event is a sporting event taking place at a venue accommodating a plurality of spectators watching the sporting event in person;
the users of the plurality of client devices include spectators of the plurality of spectators watching the sporting event in person;
each of the respective virtual objects is a virtual instance of an object associated with the sporting event; and
the real-world target location is a location visible to the plurality of spectators within the venue during the sporting event.

17. The system of claim 10, wherein a particular video rendered by the system and streamed to a particular client device is customized to emphasize an attempt of a user of the particular client device to direct a particular virtual object to the target by concurrently depicting the asynchronous attempts from a moving vantage point that follows the particular virtual object on a virtual trajectory of the particular virtual object.

18. A multi-access edge computing (MEC) server comprising:
a communication interface configured to exchange data, by way of a provider network within which the MEC server is implemented, with a plurality of client devices engaged in a massive multiplayer application;
a memory storing instructions; and
a processor communicatively coupled to the memory and configured to execute the instructions to:
obtain, from the plurality of client devices by way of the communication interface and the provider network, trajectory data representative of asynchronous attempts, by users of the plurality of client devices, to direct respective virtual objects associated with each client device to a target at a real-world location and associated with a real-world event;
determine, based on the trajectory data, a plurality of virtual trajectories for the asynchronous attempts to direct the respective virtual objects to the target;
render, based on the plurality of virtual trajectories, a plurality of videos that each concurrently depict the asynchronous attempts to direct the respective virtual objects to the target; and
stream, by way of the communication interface and the provider network, different videos of the plurality of videos to different client devices of the plurality of client devices, wherein each particular video streamed to each particular client device is customized to emphasize, over other asynchronous attempts by other users of other client devices, an attempt of a user of the particular client device to direct a virtual object associated with the particular client device to the target.

19. The server of claim 18, further comprising a target verification system communicatively coupled to the MEC server by way of the provider network and configured to determine and report an outcome of the massive multiplayer application based on target verification data indicative of whether each of the respective virtual objects is successfully directed to the target;
wherein the processor is further configured to execute the instructions to:
identify a criterion for determining whether each of the respective virtual objects is successfully directed to the target,
determine whether each of the plurality of virtual trajectories complies with the identified criterion,
generate, based on the determining of whether each of the plurality of virtual trajectories complies with the identified criterion, the target verification data, and
provide the target verification data to the target verification system.

20. The server of claim 18, wherein:
the real-world event is a sporting event taking place at a venue accommodating a plurality of spectators watching the sporting event in person;
the venue is located within a coverage area of the provider network and the MEC server is located proximate to the venue;
the users of the plurality of client devices include spectators of the plurality of spectators watching the sporting event in person;
each of the respective virtual objects is a virtual instance of an object associated with the sporting event; and
the real-world location of the target is a location visible to the plurality of spectators within the venue during the sporting event.

* * * * *